US 6,574,266 B1

(12) United States Patent
Haartsen

(10) Patent No.: US 6,574,266 B1
(45) Date of Patent: Jun. 3, 2003

(54) BASE-STATION-ASSISTED TERMINAL-TO-TERMINAL CONNECTION SETUP

(75) Inventor: Jacobus Cornelis Haartsen, DK Borne (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/340,061

(22) Filed: Jun. 25, 1999

(51) Int. Cl.[7] ................................................ H04B 1/713
(52) U.S. Cl. .................. 375/133; 375/219; 375/356; 370/349; 455/434; 455/464
(58) Field of Search ................................. 375/133, 134, 375/138, 149, 219, 356; 370/252, 349, 473; 455/62, 434, 464

(56) References Cited

U.S. PATENT DOCUMENTS

| | | | |
|---|---|---|---|
| 4,453,247 A | 6/1984 | Suzuki et al. ............... | 370/473 |
| 4,841,574 A | 6/1989 | Pham et al. ................. | 704/201 |
| 5,148,429 A | 9/1992 | Kudo et al. ................. | 370/252 |
| 5,353,341 A | 10/1994 | Gillis .......................... | 375/219 |
| 5,439,775 A | 8/1995 | Fulghum et al. ............ | 375/133 |
| 5,491,837 A | 2/1996 | Haartsen ..................... | 455/62 |
| 5,528,623 A | 6/1996 | Foster, Jr. ................... | 375/134 |
| 5,636,243 A | 6/1997 | Tanaka ........................ | 455/434 |
| 5,699,409 A | 12/1997 | Kojima ....................... | 455/464 |
| 5,717,689 A * | 2/1998 | Ayanoglu .................... | 370/349 |
| 5,903,618 A * | 5/1999 | Miyake et al. .............. | 375/356 |
| 6,026,297 A * | 2/2000 | Haartsen ..................... | 455/426 |
| 6,138,019 A * | 10/2000 | Trompower et al. ........ | 455/436 |

FOREIGN PATENT DOCUMENTS

| | | |
|---|---|---|
| EP | 0329997 | 8/1989 |
| EP | 0399612 | 11/1990 |
| WO | 99/26430 | 5/1999 |

OTHER PUBLICATIONS

Spears, William M., "Simulated Annealing for Hard Satisfiability Problems" in "Cliques, Coloring, and Satifiablity: Second DIMACS Implementation Challenge", David S. Johnson and Michal A. Trick (eds.), DIMACS Series in Discrete Mathematics and Theoretical Computer Science, vol. 26, pp.533–588, American Mathematical Society (1996).

Haartsen, Jaap, "BLUETOOTH—The universal radio interface for ad–hoc, wireless connectivity", found in Ericsson Review, Telecommunications Technology Journal No. 3, 1998.

* cited by examiner

Primary Examiner—Shuwang Liu
(74) Attorney, Agent, or Firm—Burns, Doane, Swecker & Mathis, L.L.P.

(57) ABSTRACT

A system and method for establishing ad hoc communication sessions between remote communication terminals is disclosed. A base station transmits a beacon signal including information about the identity and system clock of the base station. Remote terminals within range lock to the base station, synchronizing their system clocks with the base station's clock and setting their hop sequence and hop sequence phase based on information in the beacon signal. To establish an ad hoc communication session, a master terminal first establishes a link to the base station, which establishes a link to a desired slave terminal. The base terminal exchanges information between remote terminals that enables the master terminal to establish a direct communication session with a slave terminal.

22 Claims, 8 Drawing Sheets

BASE-STATION-ASSISTED TERMINAL-TO-TERMINAL CONNECTION SETUP

BACKGROUND

This invention relates to radio communication systems. In particular, it relates to ad-hoc radio systems that use frequency hopping in cordless telephony scenarios, such as cellular radio telephony and wireless local area networks (WLANs).

In the last decades, progress in radio and integrated circuits using very large scale integration (VLSI) technology has fostered widespread use of radio communications in consumer applications. Portable communication devices, such as mobile telephones, can now be produced having widely acceptable cost, size, and power consumption. Computing devices have experienced the same progress, leading from the desktop personal computer (PC) to notebook computers to sub-notebook computers and to personal digital assistants (PDAs). Today's miniaturized radio systems enable such computing devices to communicate wirelessly, either by themselves or in combination with mobile radio telephones. The separation between the telecommunication industry on the one hand and the PC industry on the other hand is gradually vanishing.

Many commercial wireless communication systems use the radio spectrum ranging from about 800 MHz up to about 5000 MHz (5 GHz). The radio spectrum is a scarce resource, and with the increasing need for that resource due to both the demand for increased bandwidth (higher data rates) and the continuously rising number of users, efficient spectrum usage is essential if the increasing need is to be met. This holds both for the spectrum controlled by communication system operators (licensed bands used for example for public radio telephony) and the spectrum that is free for all to use (unlicensed bands like the globally available industrial, scientific, and medical (ISM) bands at 900 MHz, 2400 MHz, and 5700 MHz).

Most radio systems in consumer applications today, like cellular or cordless telephony, wireless Internet, etc., consist of a fixed, wired infrastructure and portable terminals. The portable devices reach the infrastructure via access points or base stations. To be spectrally efficient, the radio spectrum is re-used in different geographical locations of the infrastructure. This means that independent users can use the same radio channel, provided their geographical separation is such that their signal-to-interference ratios, where the interference is co-channel interference, are good enough for acceptable reception. The current kind of interaction between wireless remote terminals and fixed infrastructures is acceptable since most communication takes place between wireless terminals and devices wired to the infrastructure (like a desk telephone, a computer server, a PC connected via a cable modem, etc.). However, wireless user scenarios are changing, and with the increasing proliferation of cheap radio transceivers, communication between portable devices will continue to increase. In particular, local (short-range) communication sessions between devices like laptop computers, printers, mobile phones etc., will increase in the coming years.

The current architecture of a wireless system like a cellular radio telephone system has a fixed part comprising a plurality of geographically separated base stations and a number of remote terminals, many of which may be portable. FIG. 1 depicts the typical architecture of a radio system 100, comprising fixed base stations (BS) 110, which have respective radio coverage areas (cells) 120 indicated by the dashed lines, and portable terminals 140. Each BS 110 typically has one or more radio transceivers that provide interfaces between the public switched telephone network and portable radio telephones and other remote terminals located in its cell. The fixed site transceivers 110 and remote terminals 140 communicate by exchanging RF signals, employing various formats (analog, digital, and hybrids) and access techniques (frequency division multiple access (FDMA), time division multiple access (TDMA), code division multiple access (CDMA), and hybrids). General aspects of such cellular radio telephone systems are known in the art.

Each BS 110 handles a plurality of traffic channels, which may carry voice, facsimile, video, and other information, through a traffic channel transceiver that is controlled by a control and processing unit. Also, each BS includes a control channel transceiver, which may be capable of handling more than one control channel and is also controlled by the control and processing unit. The control channel transceiver broadcasts control information over the control channel of the BS or cell to terminals 140 that are "locked", or synchronized to that control channel. This locking allows the terminals 140 to be reached quickly and to reduce their power consumption since they are synchronized to the base stations.

In an FDMA radio telephone system, each remote terminal is allocated a radio channel (e.g., an RF carrier signal for transmitting and an RF carrier signal for receiving) for the duration of a communication session with the fixed site transceiver(s). The transmitters in the remote terminal and in the fixed site typically produce RF power levels that are controlled in a way that minimizes interference with other transmitters in the system.

In a TDMA radio telephone system like the Global System for Mobile communications (GSM) currently in use in many parts of the world, each carrier signal is time-shared by up to eight radio telephones, i.e., each carrier signal transports successive frames of eight time slots each. During its assigned time slot, a radio telephone tunes its transmitter to the proper frequency, ramps to the output power level, transmits the desired information, and then ramps down so as not to interfere with other users. In a GSM system, the length of each time slot is about 577 microseconds.

In a typical direct sequence CDMA (DS-CDMA) system, an information bit stream to be transmitted is superimposed on a much-higher-rate bit stream that typically consists of consecutive symbols that are sometimes called spreading sequences. Usually, each information bit stream is allocated a unique spreading sequence that is consecutively repeated to form the much-higher-rate bit stream. Each bit of the information bit stream and the spreading sequence are typically combined by multiplication, or modulo-2 addition, in a process sometimes called coding or spreading the information signal. The combined bits stream may be scrambled by multiplication by another, usually pseudo-noise, bit stream, with the result transmitted as a modulation of a carrier wave. A receiver demodulates the modulated carrier and correlates the resulting signal with the scrambling bit stream and the unique spreading sequence to recover the information bit stream that was transmitted.

In North America, a digital cellular radiotelephone system using TDMA is called the digital advanced mobile phone service (D-AMPS), some of the characteristics of which are specified in the TIA/EIA/IS-136 standard published by the Telecommunications Industry Association and Electronic Industries Association (TIA/EIA). Another digital communication system using direct-sequence CDMA is specified by the TIA/EIA/IS-95 standard, and a frequency-hopping CDMA communication system is specified by the EIA SP 3389 standard (PCS 1900). The PCS 1900 standard is an implementation of GSM for personal communication services (PCS) systems. In these communication systems, communication channels are implemented by frequency-modulating RF carrier signals that have frequencies near 800 megahertz (MHz), 900 MHz, 1800 MHz, and/or 1900 MHz. One form of GSM radio telephone communicates with an associated base station in the frequency bands 890–915 MHz (up link) and 935–960 MHz (down link), with each frequency band being divided into 124 channels with a separation of 200 KHz.

Communication between portable terminals is possible in these systems, of course, but today this is always mediated by one or more base stations 110. For example, if both terminals are locked to the same base station, that base station establishes a first radio link to one of the remote terminals and then that base station establishes a second radio link to the other remote terminal. After the links are established, i.e., during the communication session, the base station relays information received from one terminal to the other and vice versa. FIG. 2 illustrates this exemplary situation of a terminal-to-terminal link between remote terminals 240, 250 that is mediated by a single base station 210. Of course, it will be appreciated that one base station can pass information to another base station as part of the relay between the terminals.

This is not an efficient use of the radio spectrum when the terminals are close enough together that they could communicate directly since two links (radio channels) have to be established (three radio units are involved) in the session when only a single link or channel would suffice. The system's capacity is thus reduced by a factor of two. A common scenario for this kind of operation is the intercom feature of a cordless telephone. In this application, the terms "wireless" and "cordless" will be used interchangeably, although "cordless" is sometimes thought to refer only to short-range communication. To improve efficiency, terminals should communicate with other terminals directly if possible, forming direct "ad hoc" connections, i.e., connections that do not involve relaying by a base station all of the information to be exchanged. Wireless systems that support ad hoc connections should provide direct communication among any radio units that are in range of one another.

Such local, ad hoc sessions can use the ISM bands at 900 MHz and 2400 MHz, which have been opened for commercial applications, and now many products have been introduced providing wireless communications in these bands. The use of these radio bands is restricted in the United States by Part 15 of the rules of the Federal Communications Commission (FCC) and in Europe by ETS 300 328 of the European Telecommunication Standards Institute (ETSI). Other countries apply similar rules. Briefly stated, the rules require a user to spread its transmitted power over the band in order to minimize the chance of interference with other users.

Such spreading can be achieved by either of two techniques that are well known in the art of spread spectrum communication systems, which include systems using the CDMA technique described above. In the frequency hopping (FH) technique, the transmitter emits a carrier signal that is modulated in a conventional way by the information to be sent and the frequency of the carrier signal is changed (hopped) according to a predetermined pattern that is known to the receiver. GSM-type systems are well-known examples of FH systems. In the general direct-sequence (DS) technique, binary information to be sent is combined with a noise-like, higher-bit-rate binary sequence that is known to the receiver and the combination sequence modulates a carrier signal having a fixed frequency.

Both spreading techniques have merits and drawbacks, but with the current state-of-the-art, FH spreading results in less complex and cheaper radio transceivers than DS spreading. FH systems operating in the U.S. in the 2.4 GHz band (2400 MHz to 2483.5 MHz) are required to hop among at least seventy-five frequencies. A new relatively low cost, low range wireless transmission system (defined by the recently developed "Bluetooth" technology) has been proposed for localized two-way data transmissions which is based on the FH concept. Bluetooth systems are envisioned as a universal radio interface in the 2.45 GHz frequency band that enables portable devices to connect and communicate wirelessly via short-range, ad-hoc networks. Readers interested in various details regarding the Bluetooth technology are referred to the article entitled "BLUETOOTH—The universal radio interface for ad-hoc, wireless connectivity" authored by Jaap Haartsen and found in Ericsson Review, Telecommunications Technology Journal No. 3, 1998, the disclosure of which is incorporated here by reference.

For a Bluetooth compatible system, the 2.4 GHz ISM band is divided into seventy-nine channels, starting at 2402 MHz and spaced apart by 1 MHz as illustrated by FIG. 3. Two or more radio units communicate by hopping their carrier signals from one channel to another channel, e.g., from 2405 MHz to 2480 MHz to 2463 MHz, etc., according to a pseudo-random pattern. As long as the units hop in synchrony and with the same phase, they simultaneously use the same channel and thus stay in contact with each other.

FIG. 4 is a general diagram of a radio transceiver 400 that can operate according to the Bluetooth system and that has a transmitting (TX) section 402 and a receiving (RX) section 404. Information to be transmitted is passed by an input of the TX section 402 to an encoding device 406, which processes the input information according to an error-correcting code and, perhaps, a security code. Forward error correction and scrambling codes are well known in the art of cellular radio telephony, so they need not be described in more detail here. The encoded information produced by the encoder 406 is provided to a modulator/up-convertor 408, which modulates a higher-frequency carrier signal with the encoded information according to the format and access technique employed by the system. The magnitude of the modulated carrier produced by the modulator/up-convertor 408 is then typically increased by a power amplifier (PA) 410, which provides its output signal to a suitable TX antenna 412. In the RX section 402, a portion of a modulated carrier signal received by a suitable RX antenna 414 is provided to a low-noise amplifier (LNA) 416, which increases the magnitude of the received portion without adding substantial noise and provides the increased modulated carrier signal to a down-converter 418. The carrier signal is stripped away by the down-converter 418, and the resulting signal is provided to a demodulator 420 that in essence produces a replica of the encoded information that modulated the carrier signal. That encoded information is decoded by a decoding device 422, and the received information is passed by an output of the RX section 404 to a user or further processing devices. The modulator/up-convertor 408, down-convertor 418, and demodulator 420 carry out their functions using local oscillator and other signals having precisely controlled frequencies that are generated by a suitable synthesizer 424. The frequencies selected for the synthesizer and other aspects of the transceiver 400 are determined by control signals provided by a controller 426.

In a FH system that can be used for setting up ad hoc connections, it is necessary to ensure that the units hop synchronously and in phase in order for communication to be maintained: the TX hop of one unit must be the RX hop of the other unit or units, and vice versa. The hopping scenario may be determined by the identity and system clock of one of the communicating devices (which is designated as the master), as is done in the Bluetooth system. That is to say, the hopping sequence is determined by the identity of the master unit, and the phase in the hopping sequence is determined by the system clock of the master unit. All other devices (slaves) that are to participate in the communication session must use the same master identity and synchronize to the system clock of the master unit in order to be synchronized to and in phase with the FH sequence. In principle, any unit can be designated as a master. The system clocks in the units are typically free-running; it is only during a communication session that respective clock offsets are temporarily added in order to adjust the slave devices' clocks to the master device's clock.

Purely ad hoc communication systems have certain disadvantages. Radio channel allocation is not coordinated between the terminals, with the result that the terminals have to put a lot of effort into finding one another. A terminal must find a channel that is acceptable with respect to users of surrounding communication systems as well as the terminal it is calling and other users of its system. Adaptive channel selection schemes can be implemented that avoid collisions between users seeking to transmit on the same channel and other systems, but these usually put a large burden on the terminals with respect to power consumption, complexity, and costs and are not suitable for ad hoc communication systems with distributed control.

A larger number of channels in a FH radio system is usually preferred because it increases interference immunity. However, increasing the number of channels poses a problem for connection setup. A larger number of channels makes the channel location of a setup or page signal less certain from the point of view of an intended receiver, with the result that either the receiver must increase its amount of channel scanning (so its power consumption increases) or the delay before a connection is established increases. Using a limited number of dedicated control channels can reduce the uncertainty, but often this is either not allowed (as, for example, in the unlicensed ISM band) or not practical (due to channel re-use requirements).

The trade-off between idle mode power consumption and access delay is a serious problem with ad hoc communication systems. Radio units in a truly ad hoc system are not locked to any other device until a communication channel has to be established. When a unit is idle (i.e., not participating in a communication session), the unit must listen for other units that want to contact it. Depending on the system's degrees of freedom (i.e., the number of frequencies, time slots, or codes used), it may take some time before contact can be established, especially when an idle unit only "wakes up" and scans for incoming signals very seldom in order to save power. To reduce the setup time of a communication session, an idle unit usually has to wake up and scan more often, which increases the unit's power consumption. Since power consumption is usually an issue (especially in portable devices), scanning usually must be minimized, which can result in unacceptable delay during connection setup.

Typically, a FH radio unit in standby or idle sleeps most of the time, but periodically listens to a selected hop channel for a page message. To obtain immunity against interferers, a different hop channel is selected each time the radio unit wakes up, the hop sequence followed is based on the unit's identity, and the phase is determined by the unit's free-running clock. A FH radio unit that wants to page another FH radio unit in order to set up a connection does not know when the other radio unit will wake up or which channel the other radio unit will be tuned to, so the paging radio unit must send its page message repeatedly on many hop channels. There are many ways to do this, some of which are described in allowed U.S. patent application Ser. No. 08/771,692 filed on Dec. 23, 1996, by J.C. Haartsen and P. W. Dent for "Access Technique of Channel Hopping Communications System" that is expressly incorporated here by reference, and in U.S. Pat. No. 5,353,341 to Gillis, U.S. Pat. No. 5,430,775 to Fulghum et al., and U.S. Pat. No. 5,528,623 to Foster, Jr. Other ways can for example be found in the IEEE 802.11 WLAN standard. The set-up time or access delay (the time its takes for two radio units to synchronize their frequency hopping) and the effort to get two units hop synchronized increases when the number of hop channels increases and/or the ratio of time spent listening to time spent sleeping decreases.

For cordless telephone applications, the setup time is a critical parameter; it may take too long to establish an ad-hoc connection. To decrease the ad-hoc setup time, either the uncertainty in frequency and/or the uncertainty in time must be reduced. Reducing the frequency uncertainty means reducing the number of channels (frequencies) that must be searched for a page message; this reduces the system's immunity against interferers and may violate the rules for using the spectrum, even an unlicensed band like the ISM band. Reducing the time uncertainty means increasing the ratio of time spent listening to time spent sleeping, but this results in more power consumption, which is undesirable for many devices, like portable telephones.

One solution is to lock the portables (remote terminals) to a FH base station even before a connection is established. If a terminal comes in range of the base station, it automatically locks to that base station and can then go to sleep, i.e., enter a low-power mode, as described for example U.S. patent application Ser. No. 09/210,594 filed on Dec. 15, 1998, by J.C. Haartsen and J. Elg for "Central Multiple Access Control for Frequency Hopping Radio Networks", which is expressly incorporated here by reference. In the low-power mode, the remote terminal wakes up periodically and listens to a broadcast or beacon message transmitted by the base station. Since the terminal and base station are locked, i.e., synchronized, the ratio of the time spent listening to the time spent sleeping can be very small since the terminal knows when and where to listen for the beacon. Therefore, when locked, the terminal can enter a low-power mode having very little scanning activity and can still make and receive calls with a reasonably fast access time. Locking a terminal to a beacon channel in this way is adequate when connections are made between the terminal and the PSTN via a base station, but not for intercom calls in which one remote terminal wants to connect to another remote terminal.

It is therefore an object of this invention to increase spectral efficiency while reducing setup time and power consumption in cordless telephony systems employing FH, and to provide efficient spectrum utilization for ad-hoc and intercom connections while still obtaining fast connection setup with low power consumption in FH cordless systems.

SUMMARY

Applicants' invention solves the problems of previous ad hoc FH communication systems and provides a wireless communication system having a base station that acts as a master, transmitting a beacon channel to which all sufficiently nearby remote terminals are locked. The master base station's identity and system clock determine the hop sequence and hop sequence phase, respectively. In an intercom call (ad-hoc connection) between two remote terminals, one terminal acts as a master, establishing its own hop sequence and phase based on the terminal's identity and system clock. In order to enable a fast setup of the connection between the terminals, the identity and clock of the master terminal is relayed by the master base station to the other terminal or terminals. Upon completing this information exchange via the base station, the base station orders the terminals to make a connection in an otherwise conventional ad-hoc way. Since the terminals have information regarding the hop sequence and phase to be used, there are substantially no uncertainties in either frequency or time and thus the ad-hoc connection between the terminals is established very quickly.

A central radio base station controls the traffic both for base-to-terminal connections and for terminal-to-terminal connections. The central base station can be a conventional base station in a cellular system, an access point in a WLAN system, or a cordless base station in a cordless telephone system. All remote terminals within range of the central base station are locked, i.e., synchronized, to the central base station by, for example, listening to a known broadcast channel or another control channel or beacon. While locked, a terminal can idle in a very low power consumption mode since the terminal needs only to wake up at regular intervals to listen to the known broadcast channel.

The central base station preferably has all the intelligence needed to determine what channels are attractive to use. This determination can be based on either a fixed channel plan, like the channel plans known in cellular radio telephone systems, or adaptive channel allocation measurements, or a random channel selection. In addition, the central base station knows all of the terminals' characteristics, like timing and sleep behavior. When a terminal wants to communicate with another terminal, the initiating terminal sends a request for a setup to the base station it is currently locked to. This base station then informs the terminal to be connected of this request, and this base station informs both terminals of the channel (and perhaps the timing) to use for the connection. The terminals then switch to the new channel and establish a connection.

The two terminals preferably remain locked to the central base station, viz., they continue listening to the known broadcast channel, enabling the base station to keep control over the link between the terminals. For example, if the terminal-to-terminal channel deteriorates, the terminals may request assignment of another channel. Also, maintaining the lock can prevent the terminals from (both) moving into an area where their terminal-to-terminal connection may cause interference to others, such as the users of a conventional wireless system. The terminals may advantageously report their own measurements of the radio spectrum to the central base station, thereby assisting in channel selection.

In one aspect, the present invention provides a method for establishing an ad hoc communication session between remote communication terminals in a FH communication system. The method comprises the steps of locking the remote terminals to a base station, establishing a communication link between a first remote communication terminal and the base station, and establishing a communication session between the first remote communication terminal and the second remote communication terminal using information retrieved from the base station.

In another aspect, the invention provides a system for establishing an ad hoc communication session between remote communication terminals. The system comprises a base station adapted to transmit a beacon signal over a broadcast channel, wherein the beacon signal includes information identifying the base station and information indicating base station's clock value. The system further includes at least a first remote communication terminal adapted to receive the beacon signal and to establish a communication link with the base station when the first remote communication terminal receives an instruction to establish a communication session with a second remote communication terminal. The base station establishes a communication link with the second remote communication terminal and transmits to the first and second remote communication terminals information and instructions causing the first communication terminal to establish a direct communication link with the second remote communication terminal.

BRIEF DESCRIPTION OF THE DRAWINGS

The objects and advantages of Applicants' invention will be understood by reading this description in conjunction with the drawings, in which.

DETAILED DESCRIPTION

Applicants' solution to the problems of ad hoc communications in previous FH systems is to use a system in which the remote terminals are locked to the base station(s), but where at the same time ad hoc connections can be established without further base station support.

Figure 1:
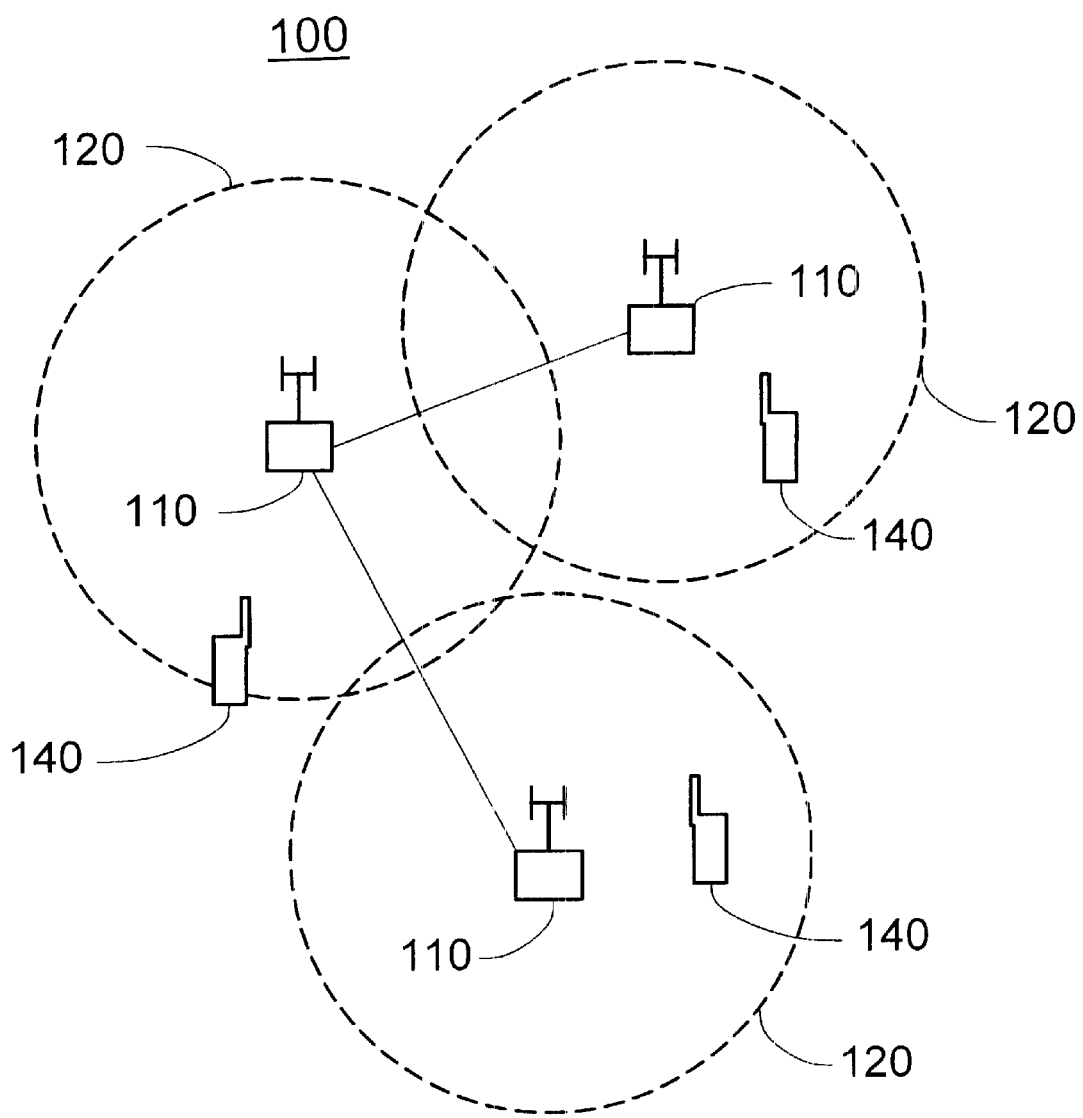
FIG. 1 depicts a conventional wireless communication system having a fixed, wired infrastructure and movable, wireless terminals.
Figure 2:
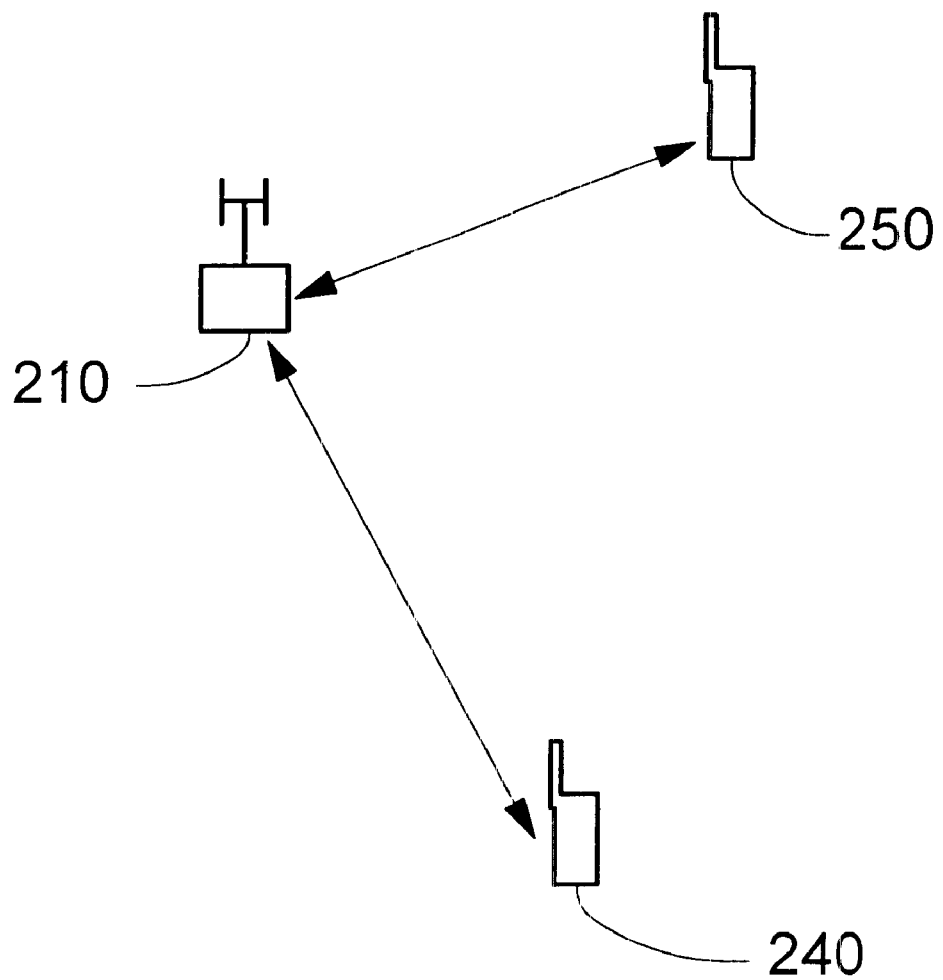
FIG. 2 depicts conventional terminal-to-terminal communication.
Figure 3:
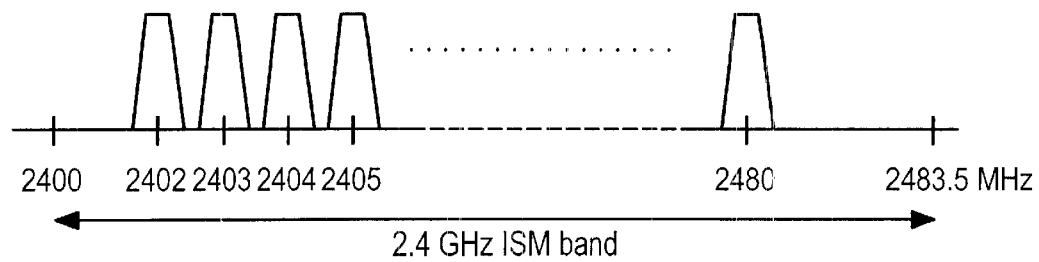
FIG. 3 shows hop channels spaced 1 MHz apart in the 2.4 GHz ISM band.
Figure 4:
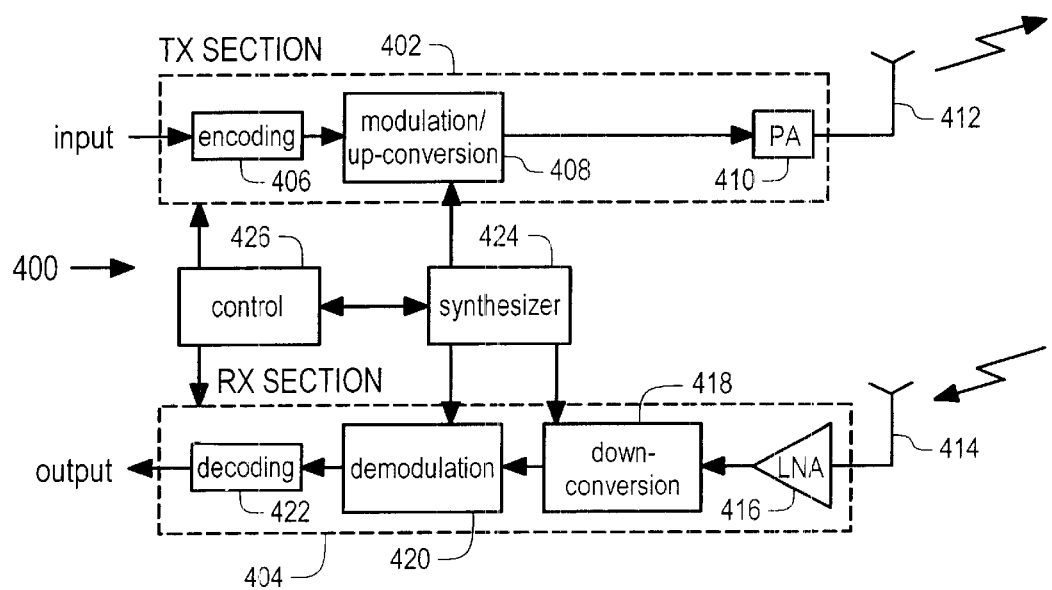
FIG. 4 is a block diagram of a transceiver using frequency hopping.

Various aspects of this FH communication system are described in the U.S. patent applications cited above and in U.S. patent applications Ser. Nos. 08/685,069; 08/932,911; and 08/932,244, all of which are expressly incorporated here by reference. In this application, a channel is a frequency hop sequence or an element of a sequence that has the properties of pseudorandom noise and that is determined by the identity of one of the units participating on the channel, i.e., the master. It will be understood that a channel can be a carrier frequency, time slot, code word, or a hybrid thereof depending on whether an FDMA system, a TDMA system, a CDMA system, or a hybrid thereof is under consideration. The phase in a frequency hop sequence is determined by the master unit's clock. As the master clock progresses, the channel hops from frequency to frequency at the master clock rate. All other units participating on a channel, i.e., the slaves, use the same FH sequence and same clock as used by the master. It will be appreciated that the controller 426 depicted in the transceiver of FIG. 4 can easily implement the necessary clock and can cause the transceiver 400 to hop from channel to channel by providing appropriate control signals to the frequency synthesizer 424.

Figure 5:
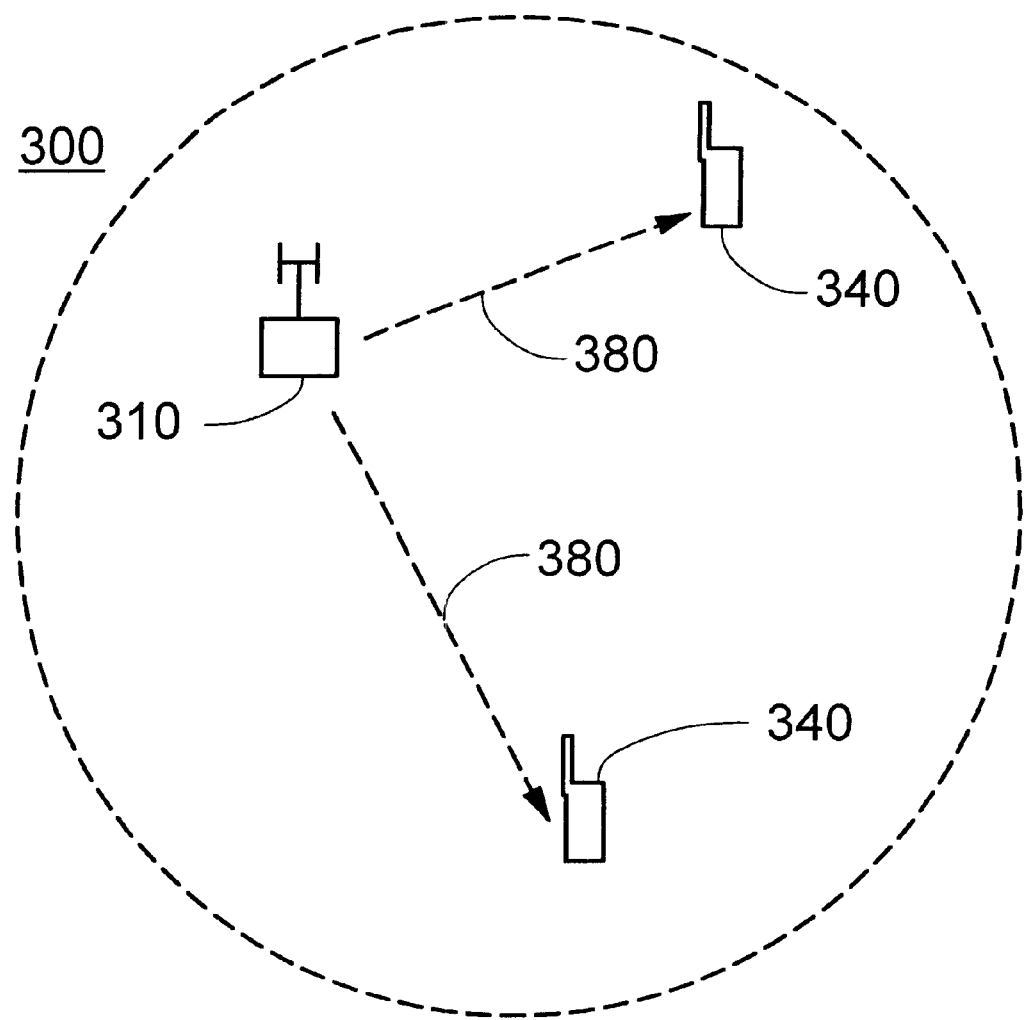
FIG. 5 shows a cordless telephone system with a fixed base station and infrastructure and movable terminals.

A FH system using the ISM band at 2.4 GHz is suitable for cordless telephone applications. Such a system is depicted by FIG. 5, which shows a cordless telephone system 300 comprising a base station 310 that may be connected to a public switched telephone network (PSTN) (not shown) and two remote terminals 340. Normally, the two terminals 340 are locked to a control channel or beacon 380 broadcasted by the base station 310. Prior to being locked the terminal 340 is in an unlocked situation, which is for example the case when it is out of range of base station 310, or when the terminal is powered up. The procedure to lock to the FH beacon is not trivial and may take some time because of the uncertainty in frequency and time. A cordless system can also be based on ad-hoc connectivity. In this case, the radio units are not locked to anything. In FIG. 5, this would mean that base station 310 and terminals 340 are in a stand-alone mode in which the terminal is not locked to the other terminal or the base station. In this unlocked condition, the terminal sleeps most of the time and periodically wakes up to listen for page messages. Only when a connection is desired will the source of the connection send a page message to the desired recipient. If the recipient receives the page message, it looks to the source and a connection is established (i.e., the terminals lock to each other) for the duration of the session. As mentioned above, the access procedure required to go from an unlocked to a locked situation may take some time since the recipient hops according its own hop sequence with its own sleep mode timing. Achieving synchronization between the source and the recipient may take some time due to the uncertainties in both time and frequency (hop channel). It will be appreciated that the terminals need only lock to each other once, when a connection is desired.

Figures 6A, 6B:
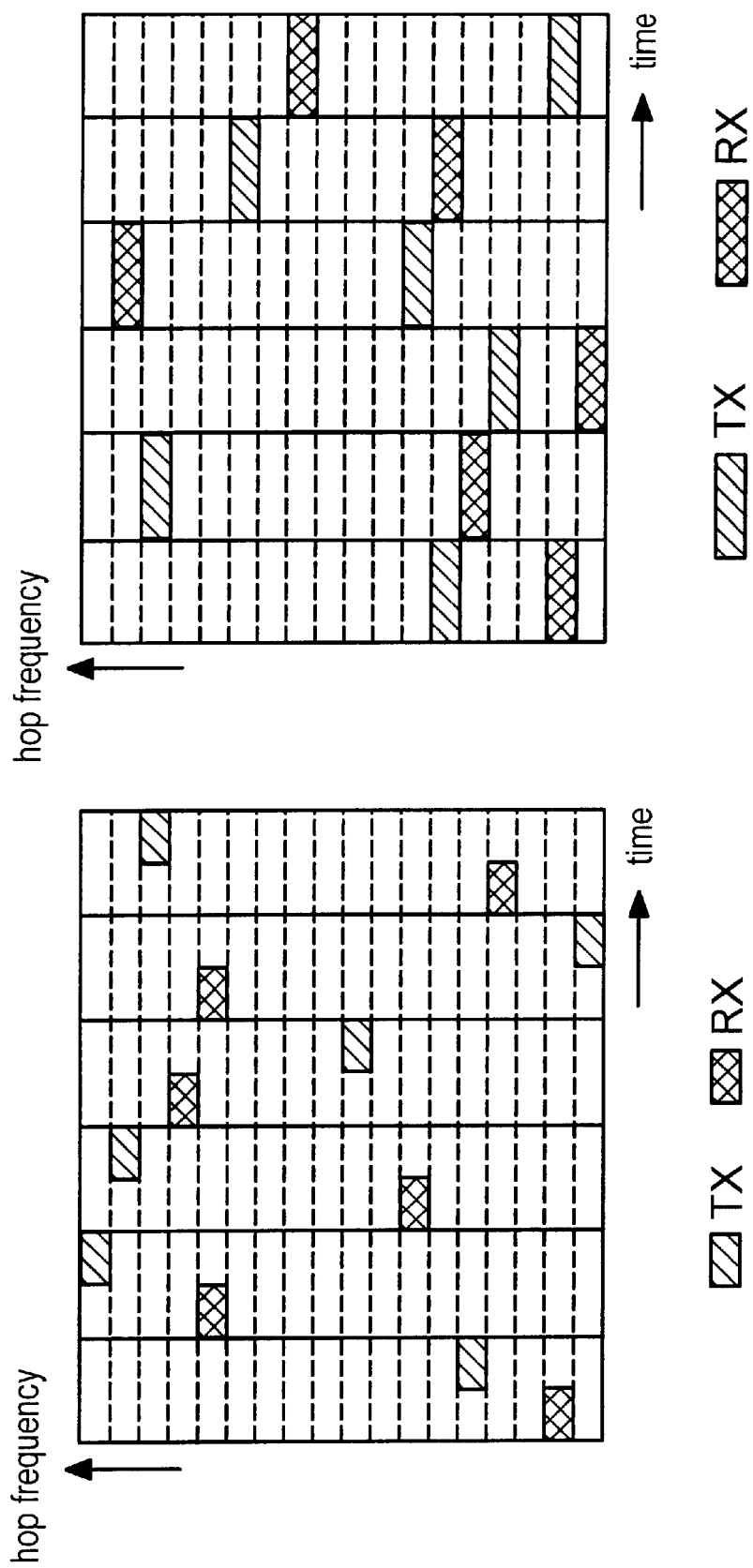
FIGS. 6A–6B depict a full duplex, frequency hopping communication link using time division duplex (TDD)

The sequence of channels shared by the master and slave(s) may be called a link, and the master and slaves form what may be called a piconet that preferably operates according to a time division duplex (TDD) scheme: slots in which traffic data is transferred from master to slave alternate at the hopping rate with slots in which traffic data is transferred from slave to master. A full duplex version of this FH arrangement is illustrated by FIG. 6A, which shows TX slots and RX slots alternating in time (the horizontal axis). In the figure, the RX slots are depicted as having carrier frequencies (the vertical axis) that are different from the carrier frequencies used in the TX slots, but it will be understood that this is not necessary in general. The hopping sequence used for the RX slots can be the same as and in phase with the hopping sequence used for the TX slots in a TDD arrangement, but this is not necessary.

It will be appreciated that Applicants' invention is not limited to a TDD arrangement but can be implemented in a frequency division duplex (FDD) arrangement as well. A full duplex version of such a FH arrangement is depicted in FIG. 6B, which shows pairs of TX slots and RX slots occurring at substantially the same times (the horizontal axis), but having different carrier frequencies (the vertical axis), of course. As in FIG. 6A, the FDD scheme depicted in FIG. 6B shows a hop sequence for the TX slots that is different from the hop sequence for the RX slots, but in general it is possible to use the same sequence but with either a frequency offset or a time offset.

The master may control access to the piconet and channels by a polling scheme, for example as described in U.S. patent application Ser. No. 09/210,594 cited above. At any moment, a master may select any participating slave and send data to the selected slave in a master-to-slave slot, and only the selected slave may reply in the succeeding slave-to-master slot. A suitable addressing scheme provides each unit with a unique identity, which may, for example, be derived from the 48-bit addressing space provided in the IEEE 802 standard. Each unit's unique identity is used during the process of setting up a connection to page that unit.

Each packet of information transmitted in a slot advantageously has a preamble that is also derived from the master's identity, and this preamble is used by all the units participating in the piconet to identify whether there is a packet present in the slot, and if so whether the packet belongs to this piconet. Since many uncoordinated FH piconets may overlap, occasionally two or more may happen to land on the same hop frequency. The preamble prevents units in one piconet from accepting packets belonging to another piconet. The preamble that is derived from the master address thus identifies the piconet (or channel) and can be regarded as a channel identifier.

To distinguish between the different participants on the same piconet, a Medium Access Control (MAC) address may be temporarily allocated by the master to a slave when the slave is connected to the piconet. A MAC address can be short, e.g., three bits, since it has only to distinguish the units participating in a piconet. The MAC address may be located in the header of transmitted information packets. The master uses the appropriate MAC address to address the respective slave, and only the slave that corresponds to that MAC address will interpret the transmitted payload and be allowed to reply in the next slave-to-master slot. A predetermined MAC address, such as an all-zero MAC address, can be used by a base station or other transmitter to identify broadcast messages that should be interpreted by all piconet participants.

Figure 7A:
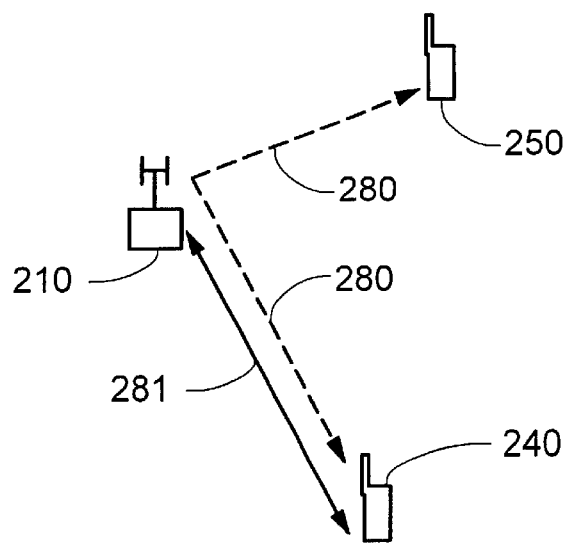
FIGS. 7A, 7B, and 7C depict steps in setting up terminal-to-terminal communication according to the present invention.
Figure 7B:
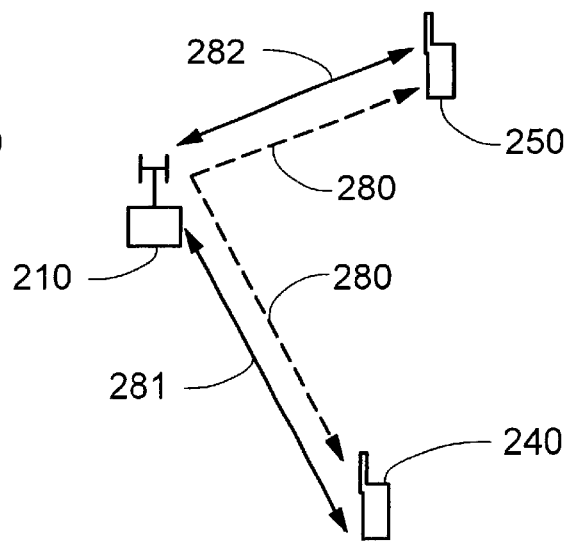
Figure 9:
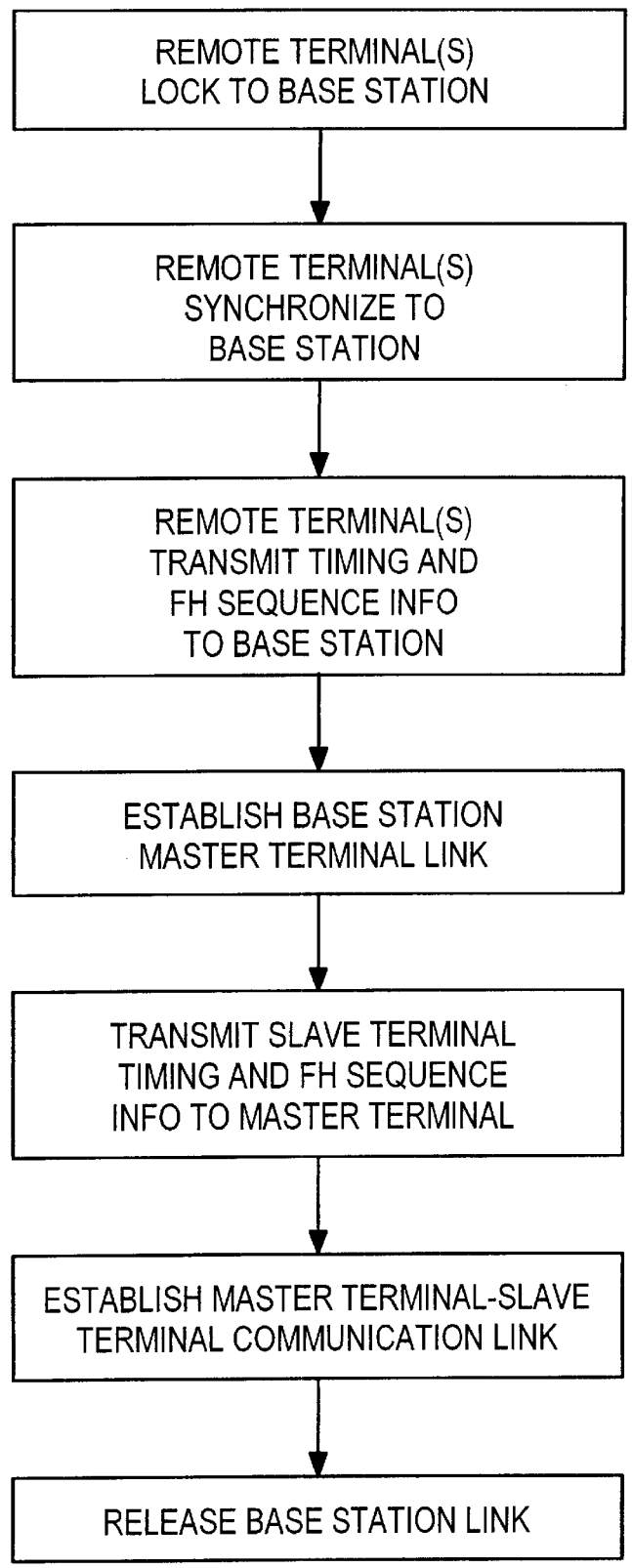
FIG. 9 is a flow chart illustrating a method of setting up a terminal-to-terminal connection according to the present invention.

The setup process for an ad hoc communication session in accordance with Applicants' invention can be described in connection with the system diagram depicted in FIGS. 7A, 7B, 7C and the method depicted in FIG. 9. Beginning in an idle mode depicted by FIG. 7A, remote terminals 240, 250 are locked to a base station 210 as indicated by the dashed lines 280. It is currently preferred for locking to be based on a beacon signal transmitted by the base station 210 on a broadcast channel 280, with the beacon signal carrying, for example, the base station's identity, and other system information and paging information and supporting remote terminal requests for channels. At connection setup, the master unit transfers the parameters required to maintain FH synchronization to the slave(s).

Terminals 240, 250 that are locked to the beacon channel use the base station's identity to determine the hop sequence they should follow, and they adjust their clocks to maintain synchronization to the FH beacon channel. Each terminal can add either a positive or negative offset to its system clock, implemented by the controller 427 in the transceiver depicted in FIG. 4, such that its adjusted clock value is substantially equal to the base station's clock value. Such a clock offset advantageously is preferably used only when the terminal is locked to a base station. When the terminal is not locked, its clock can return to a free-running state. When a (slave) terminal is locked to another (master) terminal, the (slave) terminal adds an offset based on the difference between its clock and the other (master) terminal's clock.

Suppose that the terminal 240 wants to connect to the terminal 250. As part of its normal mode of operation, terminal 250 periodically wakes up and scans for page request messages from other terminals. After terminal 250 locks to base station 210, terminal 250 transmits to base station 210 the timing and frequency hop sequence terminal 250 uses for its page scanning procedure. It will be noted that terminal 250 need only transmit this information once, which may be done when terminal 250 locks to base station 210. At this time, terminal 250 may also convey additional information required for registration with base station 210. When terminal 240 wants to connect to terminal 250, terminal 240 first requests a communication link to base station 210, for example by a suitable exchange of messages. Once this full duplex link 281 is established, the terminal 240 can then send a request message to the base station 210 that requests a connection to the terminal 250. Base station 210 may then convey to terminal 240 the timing and frequency hop sequence terminal 250 uses for its page scanning process. Terminal 240 may then transmit a page message to request a direct connection with terminal 250 at the correct time and using the appropriate frequency hop sequence, thereby reducing the set-up time required to establish the ad-hoc connection between terminal 240 and 250. When this paging procedure is successful, terminals 240 and 250 establish a direct full-duplex link as depicted in FIG. 7C.

Alternatively, in response to the request message from the terminal 240, the base station 210 determines the base station to which the terminal 250 is locked. FIG. 7A depicts the situation in which the terminal 250 is locked to the same base station 210 as the terminal 240, but this need not always be the case. The base station 210 then either transmits a page message to the terminal 250 or causes another base station to transmit a page message to this terminal, and as depicted in FIG. 7B, a full duplex link 282 may optionally be established between the base station 210 and terminal 250.

Figure 7C:
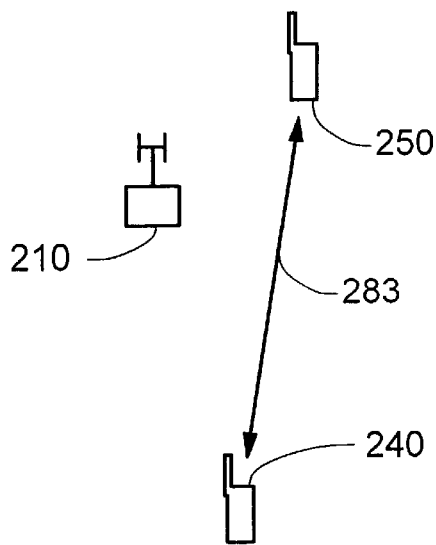

Finally as illustrated by FIG. 7C, the base station 210 sends a message to both terminals 240, 250, causing the terminals to establish a new, direct full duplex link 283 and to release the full duplex links 281, 282. The terminals 240 and 250 can then continue their communication session on the link 283.

The channels used for the links 281, 282 and even 283 can be assigned by the base station 210, and these assignments can be based on various considerations, e.g., the identity of the master terminal, addresses of one or more communication terminals, pseudorandom selection, other hop sequences currently in use, reports from terminals locked to the base station 210 of measurements of signal strength or interference levels, reports from terminals locked to other base stations, reports from other base stations, etc.

Figure 7D:
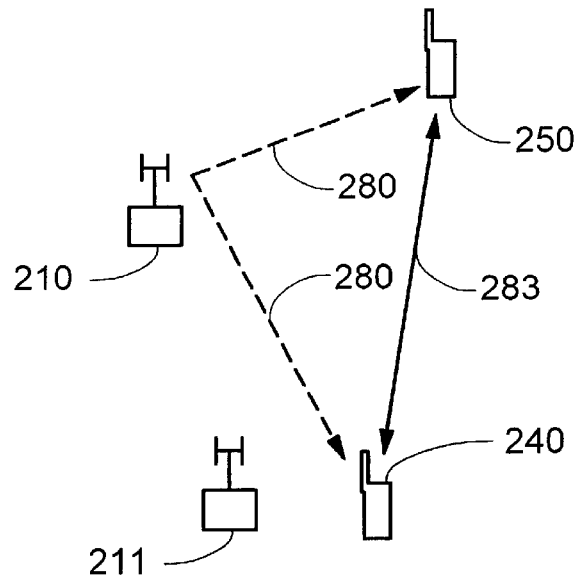
FIG. 7D depicts another possible step in setting up terminal-to-terminal communication according to the present invention.

After the link 283 is established and links 281, 282 are released, the base station 210 may advantageously keep control of the terminals 240, 250 by requiring them to continue listening to the broadcast channel 280. This is depicted by FIG. 7D. In a FH system with time multiplexing, this can easily be accomplished: at one moment, the terminals listen to a channel, call it channel X, and at another moment, the terminals listen to another channel, call it channel Y. Either channel X or channel Y could be the broadcast channel 280, in which case, the terminals would remain locked to the base station 210.

In this embodiment, the terminals are not completely unlocked from the base station when a direct intercom channel is established. Once in a while, both terminals return to the FH beacon channel of the base station to adjust their clock offsets to the base station clock. This is advantageous in that it facilitates quick return to a base-station-locked state and it permits checking whether the base station wants to interrupt the intercom channel (for example when an external PSTN call has come in).

Figure 8:
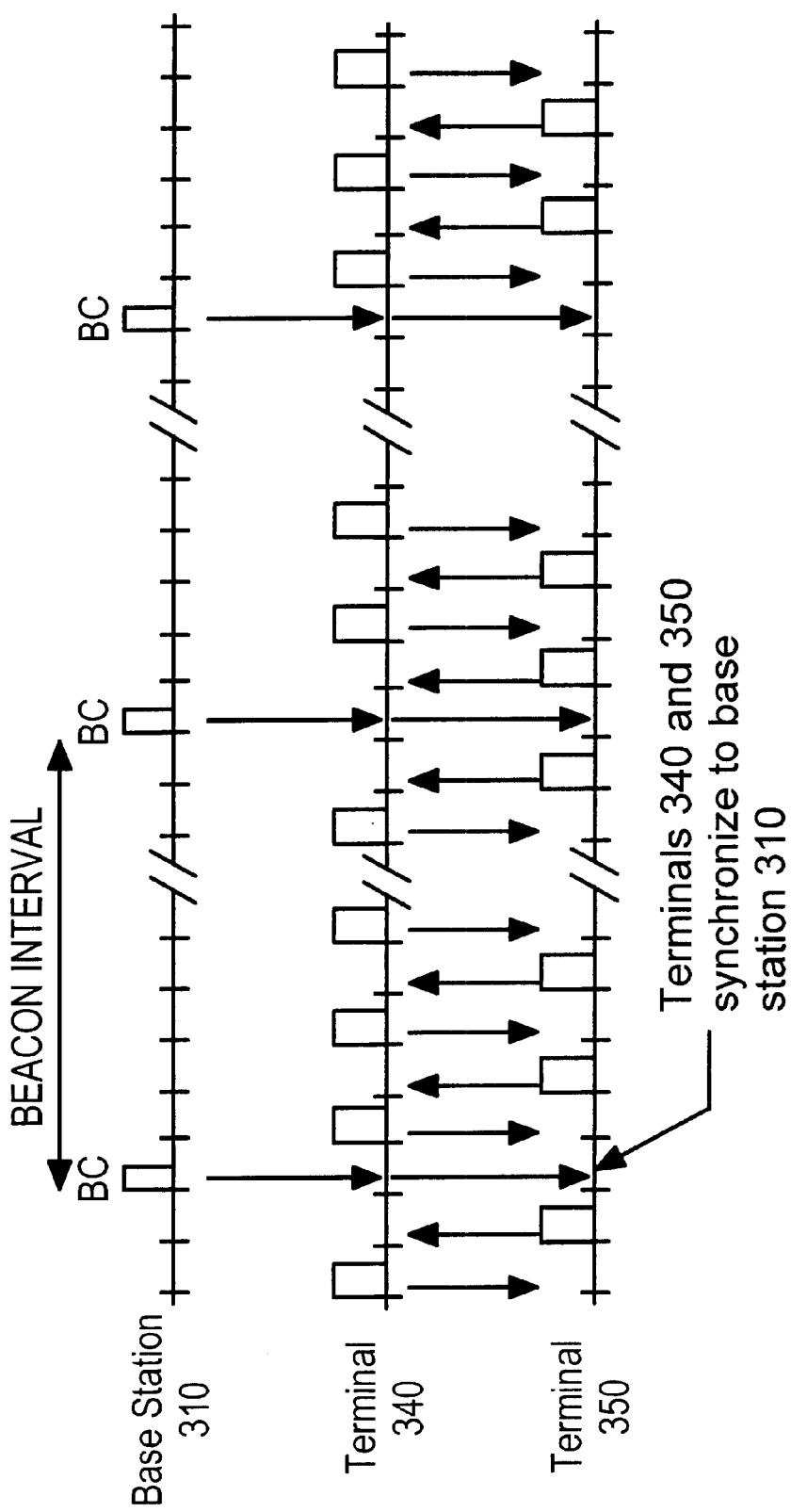
FIG. 8 is a timing diagram showing two terminals with an intercom connection and still looking to a base station according to the present invention.

An example of the transmission time lines in this embodiment is illustrated in FIG. 8. In this example, two remote terminals 340, 350 lock (i.e., are slaves) to a periodic broadcast channel BC transmitted by a base station 310 as indicated by the arrows aligning the time lines for the devices 310, 340, 350. Between the BC transmissions during their ad hoc connection, the terminals 340, 350 lock to each other, with the terminal 340 shown as the master and the terminal 350 as the slave (since the master transmits first).

One of the advantages of having the terminals stay locked to the base station arises when, for example, the quality of the link 283 deteriorates to a point where excessive errors occur in the communication. Either or both terminals 240, 250 can then easily and quickly send a message to the base station 210 requesting allocation of another channel or hop sequence. In addition, if one or both terminals move into an area or areas covered by a different base station 211 (see FIG. 7D), the terminals can request a "handover" of control from the base station 210 to the other base station 211. In that case, the base station 210 would send a message to the new base station(s), informing the new base station(s) that terminals 240, 250 having an ongoing ad hoc connection have roamed into the area or areas covered by the new base station(s). The base station 210 or the new base station 211 would also send messages to the terminals 240, 250, directing them to listen to the broadcast channel(s) of the new base station(s). A new base station 211 takes over control when the terminals 240, 250 listen to the broadcast channel of the new base station instead of the broadcast channel 280 of the base station 210. As a result of such a handover, the channel 283 may be changed, e.g., to minimize interference, etc.

As a result of Applicants' invention, the setup time is reduced considerably by support from a base station that takes the form of information that the terminals can use to speed up the setup process. If a first remote terminal wants to connect to a second remote terminal, the first terminal needs to know only the second terminal's identity in order to determine the FH sequence and the value of the second terminal's clock in order to determine the phase in that FH sequence. This information can be collected by the base station from the second terminal and sent to the first terminal (s) that want to establish a connection(s). The base station acts as a relay only during the first part of the process of setting up the terminal-to-terminal connection.

It will be appreciated that when an initiating remote terminal wants to connect to a recipient remote terminal, the initiating terminal may unlock from its base station and start an ad-hoc access process preferably such as that described in U.S. patent application Ser. No. 08/771,692 that was cited and incorporated by reference above. Using knowledge of the recipient terminal's sleep behavior, which can be collected by the base station and provided to the initiating terminal, the initiating terminal can quickly establish an ad hoc connection to the recipient terminal. During the connection, the terminals lock to each other, i.e., one of the terminals (preferably, but not necessarily, the initiating terminal) acts as the master, with its unique identity and clock determining the FH sequence and phase used for the connection. Communication can then continue directly without a relay by the base station.

In yet another aspect of the invention, the base station, or any other central device to which the wireless terminals can be locked, can assist in the search for services. In the Bluetooth system, wireless devices can carry out an inquiry procedure to discover which other Bluetooth units (portable or fixed) are in range and what their capabilities and services are (like printing, cellular telephony, PSTN telephony, projector, etc.). The inquiry procedure can also be a lengthy process when the units or terminals are not locked. A similar procedure as in the connection setup is carried out where the recipients wake up periodically to scan for inquiry messages on difference frequencies, and the inquirer has to send its inquiry messages repeatedly at different frequencies. When the sleep time of the recipients increases, the inquiry procedure will take more time. Again, the base station can speed up this procedure. Instead of broadcasting an inquiry message, the terminal that searches for services establishes a connection to the base station. The base station knows which devices are locked (to itself or to nearby base stations). It can then inform the requesting terminal which other terminal or unit can supply him with the services and can give him information for a fast setup as described before. When a new terminal locks to the base station, it should provide the base station with its characteristics and the services it can provide. The base station then manages a list of features including the address and clock information of the terminals that support these features.

In the foregoing, it was assumed that a fixed base station as used to assist in the connection setup and inquiry procedures. However, it should be understood that any other device that supports the radio interface could act as the central controller or assisting "agent" to which the other units in range can be locked. This agent could, for example, be dedicated for broadcasting a beacon to which all other units can lock and for gathering information regarding the locked devices. That is, this agent unit could only be dedicated to these locking and inquiry tasks and to communicating control information without having capabilities to support user services itself. In this case, in contrast to a base station, it would not need a connection to the wired network. Several of these radio agents could inter-communicate control information (i.e. inquiry information) among each other via the radio interface.

Applicants' invention is described above with reference to particular embodiments, and it will be readily apparent to those skilled in the art that it is possible to embody the invention in forms other than those described above. The particular embodiments described above are merely illustrative and should not be considered restrictive in any way. The scope of the invention is determined given by the following claims, and all variations and equivalents that fall within the range of the claims are intended to be embraced therein.

What is claimed is:

1. In a FH communication system, a method for establishing an ad-hoc communication session between first and second remote communication terminals, comprising the steps of:

locking the remote terminals to a base station;

establishing a communication link between the first remote communication terminal and the base station;

transmitting from the first remote communication terminal to the base station information identifying the specific timing and frequency hop sequence of a page scanning process of the first remote communication terminal;

establishing a communication link between the second remote communication terminal and the base station; and transmitting the identifying information from the base station to the second remote communication terminal, the identifying information being sufficient for beginning and ending the communication session autonomously between the first remote communication terminal and the second remote communication terminal at a future point in time without any further communication from the base station required.

2. The method of claim 1, wherein the step of locking the remote terminals to a base station comprises the step of:

receiving, at the remote terminals, a beacon signal transmitted by the base station over a broadcast channel.

3. The method of claim 2, wherein the step of locking the remote terminals to a base station comprises the step of:

registering the remote terminals with the base station.

4. The method of claim 2, wherein the step of locking the remote terminals to a base station comprises the step of:

synchronizing the clocks of the remote terminals to the clock of the base station.

5. The method of claim 1, wherein the step of transmitting from the first remote communication terminal to the base station comprises the additional step of transmitting from the first remote communication terminal to the base station a request message comprising information identifying the second remote communication terminal.

6. The method of claim 1, wherein the step of establishing a communication link between the base station and the second remote communication terminal comprises the step of:

determining the base station to which the first remote communication terminal is locked.

7. The method of claim 1, comprising the additional step of establishing an ad-hoc connection to the first remote communication terminal by the second remote communication terminal using the identifying information.

8. The method of claim 7, comprising the additional step of establishing an ad-hoc communication session between the first and second remote communication terminals.

9. The method of claim 8, wherein the step of establishing a communication session between the first remote communication terminal and the second remote communication terminal comprises the step of:

synchronizing a hop sequence and hop sequence phase of the second remote communication terminal to a hop sequence and hop sequence phase of the first remote communication terminal.

10. The method of claim 8, wherein the step of establishing a communication session between the first remote communication terminal and the second remote communication terminal comprises the step of:

releasing the communication links between the base station and the remote communication terminals.

11. The method of claim 8, wherein the step of establishing a communication session between the first remote communication terminal and the second remote communication terminal comprises the step of:

maintaining the broadcast link between the base station and the remote communication terminals.

12. The method of claim 8, wherein the step of establishing a communication session between the first remote communication terminal and the second remote communication terminal comprises the step of:

selecting, at the base station, the channel used for the communication link between the first remote communication terminal and the second remote communication terminal.

13. The method of claim 8, further comprising the step of:

reassigning, at the base station, the channel used for the communication session between the first remote communication terminal and the second remote communication terminal.

14. The method of claim 8, further comprising the step of:

establishing a communication session between the first remote communication terminal and a third remote communication terminal.

15. A system for establishing an ad-hoc communication session between remote communication terminals, comprising:

a base station adapted to transmit a beacon signal over a broadcast channel, the beacon signal including information identifying the base station and information indicating the base station's clock value; and at least first and second remote communication terminals adapted to receive the beacon signal and to establish a communication link with the base station, wherein the first remote communication terminal is adapted to transmit to the base station information identifying the timing and frequency hop sequence of a page scanning process of the first remote communication terminal, the base station is adapted to provide said identifying information to the second remote communication terminal, the identifying information being sufficient for beginning and ending the communication session autonomously between the first remote communication terminal and the second remote communication terminal at a future point in time without any further communication from the base station required, and the second remote communication terminal is adapted to establish the communication session—directly with the first remote communication terminal using the identifying information.

16. A system according to claim 15, wherein:

the first remote communication terminal acts as a master terminal in the ad hoc communication session.

17. A system according to claim 15, wherein:

the second remote communication terminal acts as a slave terminal in the ad hoc communication session.

18. A system according to claim 15, wherein:

the first and second remote communication terminals, when linked to the base station, synchronize their clocks with the base station's clock.

19. A system according to claim 15, wherein:

the identifying information includes clock information of the first remote communication terminal.

20. A system according to claim 15, wherein:

the first remote communication terminal transmits to the second remote communication terminal the parameters required to define a communication channel with the second remote communication terminal.

21. A system according to claim 20, wherein:

the first remote communication terminal transmits to the second remote communication terminal the parameters required to maintain FH synchronization with the second remote communication terminal.

22. A system according to claim 15, wherein:

the second remote communication terminal synchronizes its clock to the first remote communication terminal's clock.

* * * * *